(12) United States Patent
Kachman et al.

(10) Patent No.: US 11,741,391 B2
(45) Date of Patent: Aug. 29, 2023

(54) QUANTUM TOPOLOGICAL CLASSIFICATION

(71) Applicant: International Business Machines Corporation, Armonk, NY (US)

(72) Inventors: Tal Kachman, Haifa (IL); Kenneth Lee Clarkson, Madison, NJ (US); Mark S. Squillante, Greenwich, CT (US); Lior Horesh, North Salem, NY (US); Ismail Yunus Akhalwaya, Emmarentia (ZA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 803 days.

(21) Appl. No.: 16/576,046

(22) Filed: Sep. 19, 2019

(65) Prior Publication Data

US 2021/0256414 A1   Aug. 19, 2021

(51) Int. Cl.
| | |
|---|---|
| *G06N 20/00* | (2019.01) |
| *G06N 10/00* | (2022.01) |
| *G06N 10/60* | (2022.01) |
| *G06F 18/20* | (2023.01) |
| *G06F 18/2415* | (2023.01) |
| *G06V 10/764* | (2022.01) |

(52) U.S. Cl.
CPC ....... *G06N 20/00* (2019.01); *G06F 18/24155* (2023.01); *G06F 18/29* (2023.01); *G06N 10/00* (2019.01); *G06N 10/60* (2022.01); *G06V 10/764* (2022.01)

(58) Field of Classification Search
CPC .................................................... G06N 20/00
USPC .......................................................... 706/20
See application file for complete search history.

(56) References Cited

PUBLICATIONS

Lloyd, Seth; Garnerone, Silvano; Zanardi, Paolo; "Quantum algorithms for topological and geometric analysis of data," Dec. 2015 (Year: 2015).*
Dey, Tamai; Mandal, Sayan; Varcho, William; "Improved Image Classification using Topological Persistence," 2017, Vision, Modeling, and Visualization (Year: 2017).*
Kerenidis, et al., Quantum classification of the MNIST dataset via Slow Feature Analysis, Jun. 12, 2018, 25 pages.
Du, et al., Bayesian Quantum Circuit, May 27, 2018, 17 pages.
Lloyd, et al., Quantum algorithms for topological and geometric analysis of data, Dec. 15, 2015, 20 pages.

(Continued)

*Primary Examiner* — Eric D Lee
(74) *Attorney, Agent, or Firm* — Amin, Turocy & Watson; LLP

(57) ABSTRACT

Systems, computer-implemented methods, and computer program products that can facilitate quantum topological classification are described. According to an embodiment, a system can comprise a memory that stores computer executable components and a processor that executes the computer executable components stored in the memory. The computer executable components can comprise a topological component that employs one or more quantum computing operations to identify one or more persistent homology features of a topological simplicial structure. The computer executable components can further comprise a topological classifier component that employs one or more machine learning models to classify the topological simplicial structure based on the one or more persistent homology features.

20 Claims, 14 Drawing Sheets

(56) References Cited

PUBLICATIONS

Biamonte, et al., Quantum Machine Learning, May 10, 2018, 24 pages.
Hofer, et al., Deep Learning with Topological Signatures, Feb. 16, 2018, 14 pages.
Huang, et al., Demonstration of Topological Data Analysis on a Quantum Processor, Jan. 19, 2018, 12 pages.
Schuld, et al., Circuit-centric quantum classifiers, Apr. 2, 2018, 17 pages.
Siopsis, Quantum topological data analysis with continuous variables, Apr. 4, 2018, 7 pages.
Dey, et al., Improved Image Classification using Topological Persistence, Vision, Modeling, and Visualization, 2017, 8 pages.
Geng, et al., Tricking Neural Networks: Create your own Adversarial Examples, Machine Learning @Berkley, last web accessed on Jun. 14, 2019 at https://ml.berkeley.edu/blog/2018/01/10/adversarial-examples/, 16 Pages.
Mcclean, et al., The theory of variational hybrid quantum-classical algorithms, Sep. 14, 2015, 20 Pages.
Kitaev, et al., Classical and Quantum Computation, American Mathematical Society, 2002, pp. 1-100.
Kitaev, et al., Classical and Quantum Computation, American Mathematical Society, 2002, pp. 101-273.
Cincio, et al., Learning the quantum algorithm for state overlap, Nov. 16, 2018, 12 Pages.
Leeuwaarden, et al., Quasi-birth-and-death processes, lattice path counting, and hypergeometric functions, Sep. 17, 2007, 17 Pages.
Harrow, et al., Quantum algorithm for linear systems of equations, Sep. 30, 2009, 15 Pages.
Lloyd, et al., Quantum algorithms for topological and geometric analysis of data, Nature Communications, Jan. 25, 2016, 7 Pages.
Nielsen, et al., Quantum information and quantum computation, 2000, Pages i-150.
Nielsen, et al., Quantum information and quantum computation, 2000, pp. 151-300.
Nielsen, et al., Quantum information and quantum computation, 2000, pp. 301-500.
Nielsen, et al., Quantum information and quantum computation, 2000, pp. 501-704.
Nannicini, Performance of hybrid quantum/classical variational heuristics for combinatorial optimization, Dec. 17, 2018, 15 Pages.
Woerner, et al., Quantum Risk Analysis, Jun. 20, 2018, 12 Pages.
Brassard, et al., Quantum Amplitude Amplification and Estimation, 2002, 22 Pages.
Kwok, et al., Efficient Options Pricing Using the Fast Fourier Transform, Handbooks of Computational Statistics, 2012, 24 Pages.
Lloyd, et al., Quantum principal component analysis, Sep. 16, 2013, 9 Pages.
Low, et al., Hamiltionian Simulation by Uniform Spectral Amplification, Jul. 19, 2017, 32 Pages.
Rudi, et al., Approximating Hamiltonian dynamics with the Nystrom method, Sep. 17, 2018, 22 Pages.
Kerenidis, et al., Quantum recommendation systems, Sep. 23, 2016, 22 Pages.
Tang, A quantum-inspired classical algorithm for recommendation systems, May 10, 2019, 32 Pages.
Stanley, Scaling, universality, and renormalization: Three pillars of modern critical phenomena, Reviews of Modern Physics, 1999, 9 pages, vol. 71, No. 2.
Ambainis, Quantum walks and their algorithmic applications, Feb. 1, 2008, 11 Pages.
Bini, et al., Numerical Methods for Structured Markov Chains, 2005, 340 Pages.
Lecun, et al., Deep learning, Nature, May 28, 2015, pp. 436-444, vol. 521.
Wiebe, et al., Efficient Bayesian phase estimation, Aug. 4, 2015, 12 Pages.

* cited by examiner

QUANTUM TOPOLOGICAL CLASSIFICATION

This invention was made with Government support under Contract No.: FA875018C0098 awarded by AFRL (US Air Force). The Government has certain rights in this invention.

BACKGROUND

The subject disclosure relates to topological classification, and more specifically, to quantum topological classification.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products that can facilitate quantum topological classification are described.

According to an embodiment, a system can comprise a memory that stores computer executable components and a processor that executes the computer executable components stored in the memory. The computer executable components can comprise a topological component that employs one or more quantum computing operations to identify one or more persistent homology features of a topological simplicial structure. The computer executable components can further comprise a topological classifier component that employs one or more machine learning models to classify the topological simplicial structure based on the one or more persistent homology features.

According to another embodiment, a computer-implemented method can comprise employing, by a system operatively coupled to a processor, one or more quantum computing operations to identify one or more persistent homology features of a topological simplicial structure. The computer-implemented method can further comprise employing, by the system, one or more machine learning models to classify the topological simplicial structure based on the one or more persistent homology features.

According to another embodiment, a computer program product that can facilitate quantum topological classification. The computer program product can comprise a computer readable storage medium having program instructions embodied therewith, the program instructions can be executed by a processor to cause the processor to employ, by the processor, one or more quantum computing operations to identify one or more persistent homology features of a topological simplicial structure. The program instructions can be further executable by the processor to cause the processor to employ, by the processor, a model to classify the topological simplicial structure based on the one or more persistent homology features.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits (qubits), and use interference.

Existing image classification technologies utilizing pixelated based image classification techniques are susceptive to adversarial attacks and misclassification. Topological classification is robust since it relies on invariant universal properties of the object (e.g., translation rotation (e.g., affine transformations, etc.), deformations, and intrinsic noise). Deep learning platforms rely on features and augmenting models with topological features has been shown to improve classification and training results substantially. However, classically those calculations are not trackable or scalable. Quantum (e.g., quantum phase estimation (QPE) based) algorithm provides exponential speed-up, although utilizing a QPE based algorithm is not realizable in the foreseeable future due to its stringent fault tolerance requirement.

Figure 1:
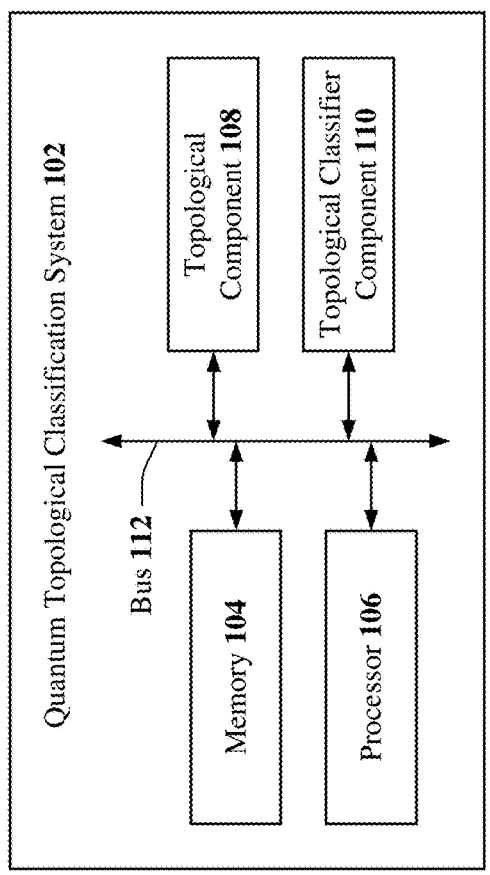
FIG. 1 illustrates a block diagram of an example, non-limiting system that can facilitate quantum topological classification in accordance with one or more embodiments described herein.

FIG. 1 illustrates a block diagram of an example, non-limiting system 100 that can facilitate quantum topological classification in accordance with one or more embodiments described herein. In some embodiments, system 100 can comprise a quantum topological classification system 102, which can be associated with a cloud computing environment. For example, quantum topological classification system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090). In this example, quantum topological classification system 102 and/or components thereof (e.g., topological component 108, topological classifier component 110, algorithmic engine component 202, etc.) can employ one or more computing resources of cloud computing environment 950 to execute one or more operations in accordance with one or more embodiments of the subject disclosure described herein. For instance, quantum topological classification system 102 and/or components thereof (e.g., topological component 108, topological classifier component 110, algorithmic engine component 202, etc.) can employ one or more computing resources of cloud computing environment 950 to execute one or more models (e.g., artificial intelligence (AI) models, machine learning (ML) models, etc.) and/or algorithms in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. Tt may be managed by the organization or a third party and may exist on-premises or off-premises.

Community cloud: the cloud infrastructure is shared by several organizations and supports a specific community that has shared concerns (e.g., mission, security requirements, policy, and compliance considerations). Tt may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise quantum topological classification system 102. In some embodiments, quantum topological classification system 102 can comprise a memory 104, a processor 106, a topological component 108, a topological classifier component 110, and/or a bus 112. In some embodiments, one or more quantum processing operations that can be executed by topological component 108 as described in accordance with one or more embodiments herein can be run on a quantum processor in cloud computing environment 950. In some embodiments, topological component 108 can execute quantum operations that run on quantum processors.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum topological classification system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum topological classification system 102, topological component 108, topological classifier component 110, and/or another component associated with system 100 and/or quantum topological classification system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to classical or quantum processing unit 814 and FIG. 8. Such examples of processor 106 can be employed to implement any embodiments of the subject disclosure.

In some embodiments, quantum topological classification system 102, memory 104, processor 106, topological component 108, topological classifier component 110, and/or another component of quantum topological classification system 102 as described herein can be communicatively, electrically, and/or operatively coupled to one another via a bus 112 to perform functions of system 100, quantum topological classification system 102, and/or any components coupled therewith. In several embodiments, bus 112 can comprise one or more memory bus, memory controller, peripheral bus, external bus, local bus, quantum bus, and/or another type of bus that can employ various bus architectures. Further examples of bus 112 are described below with reference to system bus 818 and FIG. 8. Such examples of bus 112 can be employed to implement any embodiments of the subject disclosure.

In some embodiments, quantum topological classification system 102 can comprise any type of component, machine, device, facility, apparatus, and/or instrument that comprises a processor and/or can be capable of effective and/or operative communication with a wired and/or wireless network. All such embodiments are envisioned. For example, quantum topological classification system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device. In some embodiments, using such a quantum computing device defined above to execute one or more operations of one or more embodiments of the subject disclosure described herein can reduce computational costs and increase computational speed as described below, for instance, in constructing a representation of a topological simplicial structure (e.g., simplicial complex), diagonalizing the Laplacian, and/or determining Betti numbers.

In some embodiments, quantum topological classification system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, quantum topological classification system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, quantum topological classification system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols, and/or quantum buses. In such an example, quantum topological classification system 102 can thus include hardware (e.g., a central processing unit (CPU), a transceiver, a decoder), software (e.g., a set of threads, a set of processes, software in execution) or a combination of hardware and software that facilitates communicating information between quantum topological classification system 102 and external systems, sources, and/or devices (e.g., computing devices, communication devices, etc.).

According to multiple embodiments, quantum topological classification system 102 can comprise one or more computer and/or machine readable, writable, and/or executable components and/or instructions that, when executed by processor 106 and/or a quantum processor, can facilitate performance of operations defined by such component(s) and/or instruction(s). Further, in numerous embodiments, any component associated with quantum topological classification system 102, as described herein with or without reference to the various figures of the subject disclosure, can comprise one or more computer and/or machine readable, writable, and/or executable components and/or instructions that, when executed by processor 106 and/or a quantum processor, can facilitate performance of operations defined by such component(s) and/or instruction(s). For example, topological component 108, topological classifier component 110, and/or any other components associated with quantum topological classification system 102 as disclosed herein (e.g., communicatively, electronically, and/or operatively coupled with and/or employed by quantum topological classification system 102), can comprise such computer and/or machine readable, writable, and/or executable component(s) and/or instruction(s). Consequently, according to numerous embodiments, quantum topological classification system 102 and/or any components associated therewith as disclosed herein, can employ processor 106 and/or a quantum processor to execute such computer and/or machine readable, writable, and/or executable component(s) and/or instruction(s) to facilitate performance of one or more operations described herein with reference to quantum topological classification system 102 and/or any such components associated therewith. In some embodiments, topological component 108 can execute quantum operations that run on quantum processors.

In some embodiments, quantum topological classification system 102 can facilitate performance of operations executed by and/or associated with topological component 108, topological classifier component 110, and/or another component associated with quantum topological classification system 102 as disclosed herein. For example, as described in detail below, quantum topological classification system 102 can facilitate (e.g., via processor 106 and/or a quantum processor): employing one or more quantum computing operations to identify one or more persistent homology features of a topological simplicial structure; and/or employing one or more machine learning models to classify the topological simplicial structure based on the one or more persistent homology features.

In some embodiments, quantum topological classification system 102 can further facilitate (e.g., via processor 106 and/or a quantum processor): employing the one or more quantum computing operations to construct one or more quantum representations of the topological simplicial structure corresponding to scanned, swept, varied, multiple, and/or a multitude of homological scales and pairwise distances between data points of the topological simplicial structure; employing one or more algorithms to determine the kernel of a graph Laplacian matrix restricted to a quantum representation of the topological simplicial structure at a defined homological persistent scale; employing one or more algorithms to determine one or more Betti numbers corresponding to a quantum representation of the topological simplicial structure at a defined homological persistent scale; employing at least one of a quantum phase estimation (QPE) algorithm, a variational quantum eigensolver (VQE) algorithm, or a hybrid Bayesian phase learning (β-QPE) algorithm to determine at least one of the kernel of a graph Laplacian matrix or one or more Betti numbers corresponding to a quantum representation of the topological simplicial structure at a defined homological persistent scale; employing the one or more machine learning models to classify the topological simplicial structure based on the one or more persistent homology features and one or more image classification features, where the one or more machine learning models can comprise a classical artificial intelligence model, a classical machine learning model, a quantum artificial intelligence model, and/or a quantum machine learning model; and/or employing the one or more quantum computing operations to identify the one or more persistent homology features of the topological simplicial structure to facilitate reduced computational costs of a non-quantum processor.

According to multiple embodiments, topological component 108 can employ one or more quantum computing operations to identify one or more persistent homology features of a topological simplicial structure. For example, topological component 108 can employ one or more quantum computing operations defined below in algorithm (1) to identify one or more persistent homology features of a topological simplicial structure.

Algorithm (1)

Compute (or store) distances between data points (e.g., Euclidean distances between data points of a d-dimensional space).

Fix ε (or in some embodiments, employ a superposition over epsilon), construct a quantum state encoding simplicial complex at the scale ε (e.g., via Grover Search and/or Grover-type operator (e.g., to encode a simplicial complex for a certain scale of ε)), where ε can denote a defined homological persistent scale.

Find the kernel of the Laplacian (e.g., via projecting the simplicial complex onto the kernel of the Laplacian) to determine the Betti numbers (e.g., by employing algorithmic engine component 202 described below with reference to FIG. 2, where algorithmic engine component 202 can utilize, for instance, a quantum phase estimation (QPE) algorithm, a variational quantum eigensolver (VQE) algorithm, and/or hybrid Bayesian phase learning (β-QPE) algorithm to find the kernel of the Laplacian to determine the Betti numbers).

Iterate over ε and detect persistent features across scales as captured/borne out in the Betti number dependence on the scale parameter epsilon.

Figure 3:
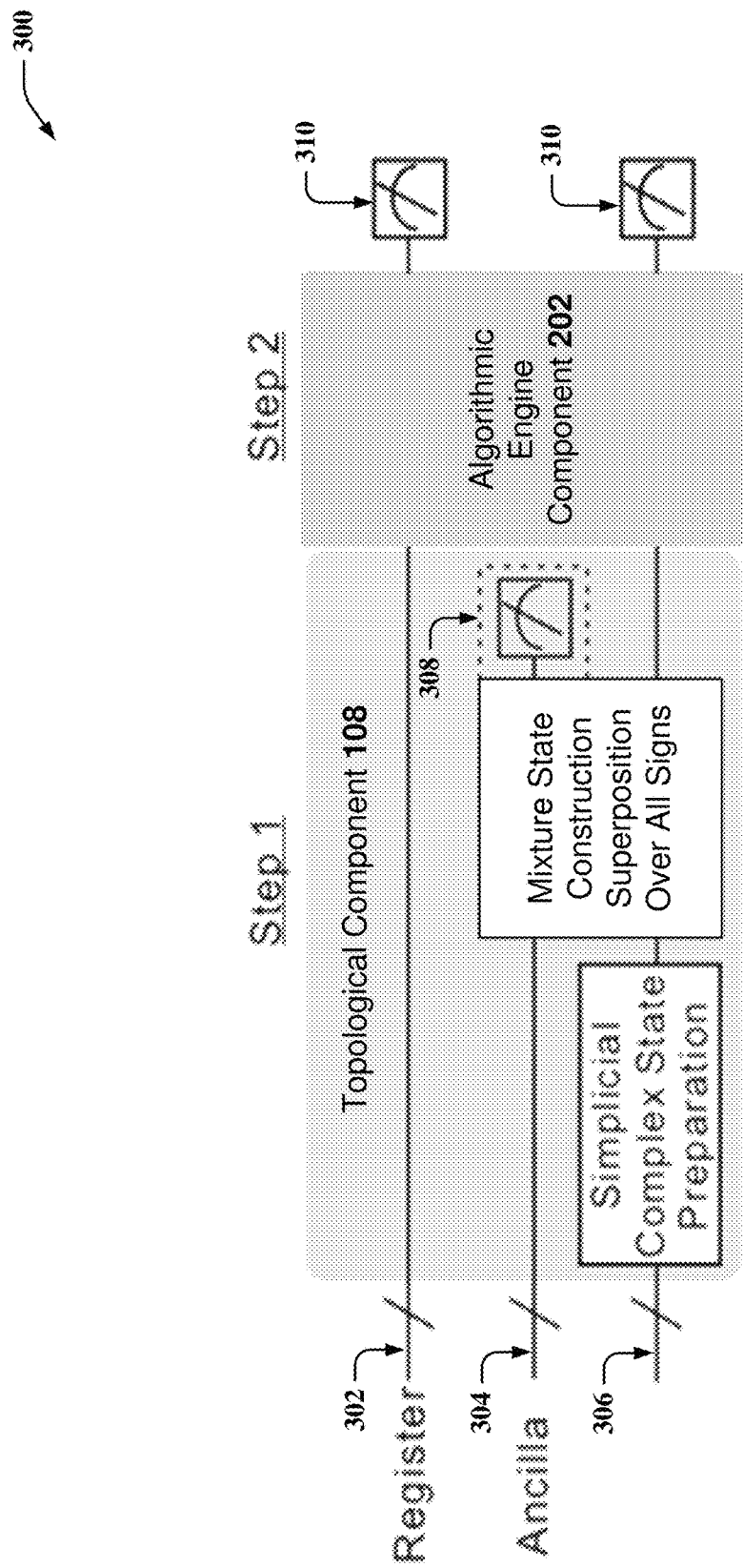
FIG. 3 illustrates a diagram of an example, non-limiting system that can facilitate quantum topological classification in accordance with one or more embodiments described herein.

In some embodiments, topological component 108 can employ such one or more quantum computing operations to construct one or more quantum representations of a topological simplicial structure corresponding to one or more scanned, swept, varied, multiple, and/or a multitude of homological scales and pairwise distances between data points of the topological simplicial structure. For example, topological component 108 can employ simplicial complex state preparation and mixture state construction operations as illustrated in FIG. 3 to construct one or more quantum representations of a topological simplicial structure corresponding to one or more scanned, swept, varied, multiple, and/or a multitude of homological scales and pairwise distances (e.g., Euclidean distances) between data points of the topological simplicial structure.

In some embodiments, topological component 108 can employ such one or more quantum computing operations to identify one or more persistent homology features of a topological simplicial structure to facilitate reduced computational costs of a non-quantum processor (e.g., processor 106). For example, topological component 108 can comprise and/or employ a quantum computing device to construct a topological simplicial structure (e.g., simplicial complex) corresponding to one or more scanned, swept, varied, multiple, and/or a multitude of homological scales and pairwise distances (e.g., Euclidean distances) between data points of the topological simplicial structure. In some embodiments, topological component 108 can comprise and/or employ a quantum computing device including, but not limited to, a quantum computer, a quantum processor, a quantum circuit, a superconducting circuit, a simulated quantum computer (e.g., software executed on a classical computer that simulates one or more operations of a quantum computer), and/or another quantum computing device.

In some embodiments, using such a quantum computing device defined above to construct such a topological simplicial structure (e.g., simplicial complex) can result in quantum computational costs of $O(n^2)$ operations on $O(n)$ qubits, whereas use of a classical computing device (e.g., a classical computer) to construct a representation of such a topological simplicial structure (e.g., simplicial complex) can result in classical computational costs of $O(2^n)$ operations on $O(2^n)$ bits, where n can denote a quantity of data points representing an image. In another example, topological component 108 can employ a quantum computing device to diagonalize the Laplacian and/or determine Betti numbers (e.g., via algorithmic engine component 202). In some embodiments, using such a quantum computing device defined above to diagonalize the Laplacian and/or determine Betti numbers (e.g., via algorithmic engine component 202) can result in quantum computational costs of $O(n^5/\delta)$ quantum operations, whereas use of a classical computing device (e.g., a classical computer) to diagonalize the Laplacian and/or determine Betti numbers can result in classical computational costs of $O(2^{2n} \log(1/\delta))$ operations, where n can denote a quantity of data points and δ can denote the desired accuracy to which the Betti numbers are to be calculated to.

According to multiple embodiments, topological classifier component 110 can employ one or more models to classify a topological simplicial structure based on one or more persistent homology features. For example, topological classifier component 110 can employ one or more models including, but not limited to, a classical artificial intelligence model, a classical machine learning model, a quantum artificial intelligence model, a quantum machine learning model, and/or another model that can classify a topological simplicial structure that can be generated by topological component 108 as described above based on one or more persistent homology features that can be identified by topological component 108 as described above.

In some embodiments, topological classifier component 110 can employ such one or more models defined above to classify a topological simplicial structure based on one or more persistent homology features and one or more image classification features. For example, topological classifier component 110 can employ such one or more models defined above to classify a topological simplicial structure that can be generated by topological component 108 as described above based on one or more persistent homology features that can be identified by topological component 108 as described above and one or more image classification features. In this example, such one or more image classification features can comprise one or more conventional image classification features that can include, but are not limited to, one or more pixelated based image classification features, conventional neural network (CNN) filter activations, earlier to later neural layer activations corresponding to low- to high-level features, Auto-encoded embeddings, Capsule-network embeddings, and/or another conventional image classification feature.

Figure 2:
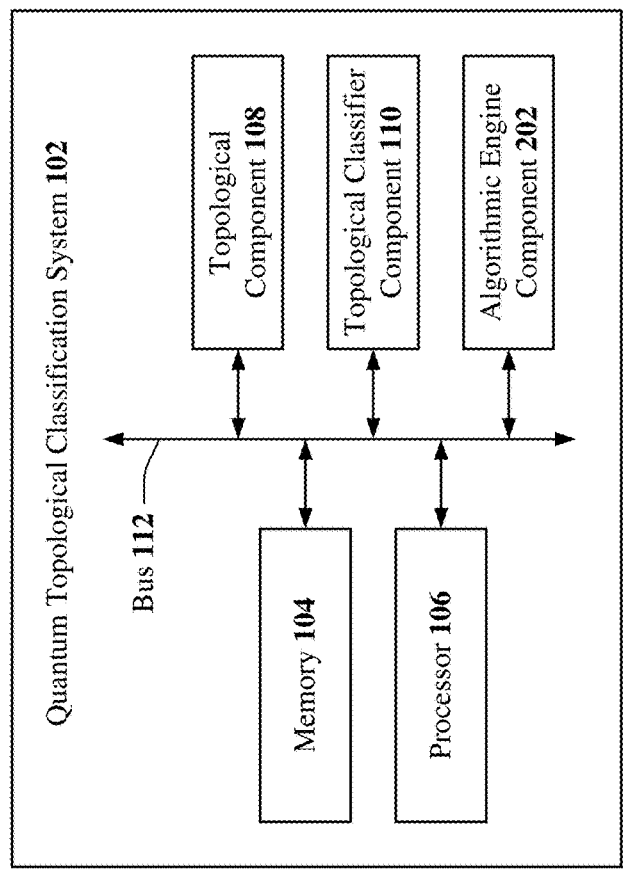
FIG. 2 illustrates a block diagram of an example, non-limiting system that can facilitate quantum topological classification in accordance with one or more embodiments described herein.

FIG. 2 illustrates a block diagram of an example, non-limiting system 200 that can facilitate quantum topological classification in accordance with one or more embodiments described herein. Repetitive description of like elements and/or processes employed in respective embodiments is omitted for sake of brevity. In some embodiments, system 200 can comprise quantum topological classification system 102. In some embodiments, quantum topological classification system 102 can comprise an algorithmic engine component 202.

According to multiple embodiments, algorithmic engine component 202 can employ one or more algorithms to determine the kernel of a graph Laplacian matrix restricted to a quantum representation of a topological simplicial structure at a defined homological persistent scale. In some embodiments, algorithmic engine component 202 can further employ such one or more algorithms to determine one or more Betti numbers corresponding to such a quantum representation of such a topological simplicial structure at such a defined homological persistent scale. For example, algorithmic engine component 202 can employ one or more algorithms including, but not limited to, a quantum phase estimation (QPE) algorithm, a variational quantum eigensolver (VQE) algorithm, a hybrid Bayesian phase learning (β-QPE) algorithm, and/or another algorithm to determine the kernel of a graph Laplacian matrix and/or one or more Betti numbers corresponding to a quantum representation of a topological simplicial structure at a defined homological persistent scale. For example, algorithmic engine component 202 can employ such one or more algorithms defined above to determine the kernel of a graph Laplacian matrix (e.g., via solving the graph Laplacian matrix) and/or one or more Betti numbers corresponding to a quantum representation of a topological simplicial structure that can be constructed by topological component 108 at a defined homological persistent scale as described above with reference to FIG. 1.

FIG. 3 illustrates a diagram of an example, non-limiting system 300 that can facilitate quantum topological classification in accordance with one or more embodiments described herein. Repetitive description of like elements and/or processes employed in respective embodiments is omitted for sake of brevity.

According to multiple embodiments, topological component 108 can comprise quantum registers including, but not limited to, an auxiliary register 302 (denoted as Register in FIG. 3), an ancillary register 304 (denoted as Ancilla in FIG. 3), and/or a register 306. In some embodiments, topological component 108 can receive via register 306 pairwise distances (e.g., Euclidean distances) between a cloud and/or collection of data points. For example, topological component 108 can receive via register 306 pairwise distances (e.g., Euclidean distances) between data points of a classical representation of a topological simplicial structure. In some embodiments, based on such pairwise distances (e.g., Euclidean distances) between data points of a classical representation of a topological simplicial structure, topological component 108 can construct a quantum representation of the topological simplicial structure. For example, topological component 108 can construct a quantum state encoding simplicial complex at a fixed scale ε (e.g., via Grover Search and/or Grover-type operator (e.g., to encode a simplicial complex for a certain scale of ε)), where ε can denote a defined homological persistent scale. In this example, such construction by topological component 108 is denoted in FIG. 3 as Simplicial Complex State Preparation. In some embodiments, topological component 108 can perform a mixture, where such mixture can involve one or more ancilla qubits that can output partial measurements 308 that can provide indications of outcomes to inquiries about the graph. In some embodiments, topological component 108 can expand the superposition over all simplices in the simplicial complex to also run over all possible sign allocations. For example, topological component 108 can employ simplicial complex state preparation and mixture state construction operations (e.g., involving one or more ancilla qubits, for instance, physical ancillas) as illustrated in FIG. 3 to construct one or more quantum representations of a topological simplicial structure corresponding to one or more scanned, swept, varied, multiple, and/or a multitude of homological scales and pairwise distances (e.g., Euclidean distances) between data points of the topological simplicial structure and expand the superposition over all simplices in the simplicial complex to also run over all possible sign allocations.

In some embodiments, based on such creation of the simplicial complex as described above, algorithmic engine component 202 can solve (e.g., find the kernel of) the graph Laplacian restricted to the simplicial complex as described above with reference to FIGS. 1 and 2. In some embodiments, based on solving the graph Laplacian, algorithmic engine component 202 can output measurements 310 that can be indicative of Betti numbers and/or other features associated with Betti numbers. In some embodiments, topological classifier component 110 (not illustrated in FIG. 3) can employ one or more models defined above with reference to FIG. 1 to classify the topological simplicial structure based on such measurements 310 (e.g., measurements corresponding to one or more persistent homology features) and the one or more image classification features defined above with reference to FIG. 1.

Figure 4:
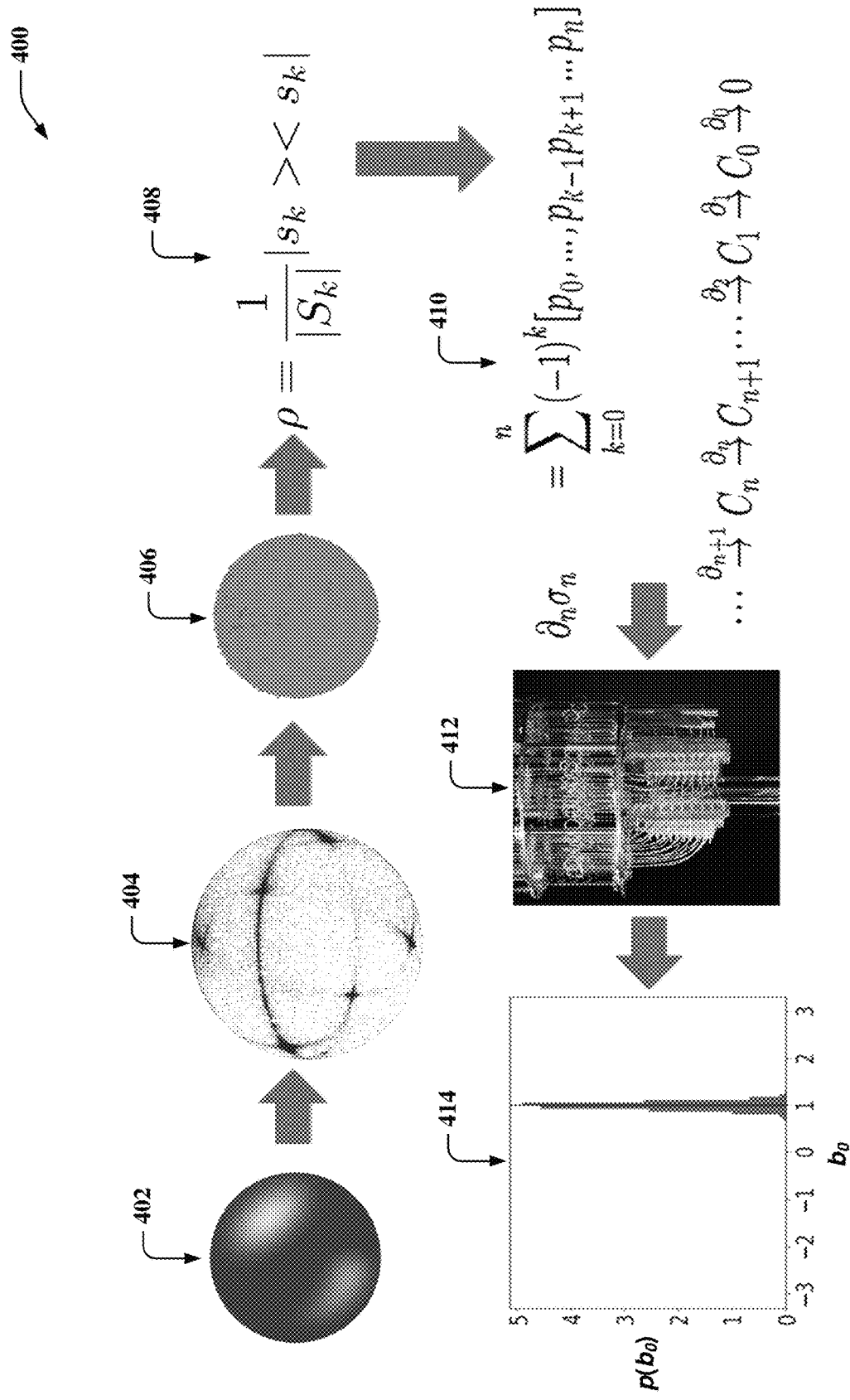
FIG. 4 illustrates a diagram of an example, non-limiting system that can facilitate quantum topological classification in accordance with one or more embodiments described herein.

FIG. 4 illustrates a diagram of an example, non-limiting system 400 that can facilitate quantum topological classification in accordance with one or more embodiments described herein. Repetitive description of like elements and/or processes employed in respective embodiments is omitted for sake of brevity.

In some embodiments, an image of a sphere 402 can be represented as a Bloch sphere 404, which can be represented as a cloud of points 406 in a feature space. In some embodiments, a cryogenic refrigerator 412 can comprise a mixing chamber stage having one or more quantum computing devices (e.g., a quantum computer, quantum processor, quantum hardware, quantum circuit, etc.), where such quantum computing device(s) can comprise topological component 108 and/or algorithmic engine component 202. In some embodiments, such one or more quantum computing devices of cryogenic refrigerator 412, which can comprise topological component 108 and/or algorithmic engine component 202, can perform the one or more quantum computing operations defined above with reference to FIGS. 1, 2, and 3 using equation 408 and/or equation 410, where equation 408 can be expressed in alternative notation as defined below in equation (1) and equation 410 can be expressed in an alternative notation as defined below in equation (2). In some embodiments, such one or more quantum computing devices of cryogenic refrigerator 412, which can comprise topological component 108 and/or algorithmic engine component 202, can perform the one or more quantum computing operations defined above with reference to FIGS. 1, 2, and 3 be employing the following operations.

In some embodiments, to start, n points in a d-dimensional space at position vectors $v_i$, i=1, 2, ..., n are given. In some embodiments, for simplicity, assume that all points are on the unit sphere (e.g., Bloch sphere 404), $|v_i|=1$. In some embodiments, more general sets of points can be considered by a straightforward extension of the following description. In some embodiments, for each vector, construct the quantum state $$|\vec{v}_i> = \sum_{j=0}^{d-1} (\vec{v}_i)_j |j>$$

which can be done using $\log_2 d$ qubits and can allow building of a simplex. In some embodiments, a k-simplex $s_k$ can be defined as a simplex consisting of k+1 vertices at points $v_{i_0}, ..., v_{i_k}$ with an associated k(k+1)/2 pairs (used in the Vitoris-Rips inclusion criterion). In some embodiments, such a simplex can be represented by a string of n bits consisting of k+1 is at positions $i_0, ..., i_k$, and 0s otherwise. In some embodiments, $s_k$ can denote the number written as this string of n bits in binary notation ($s_k \in \{0, 1, ..., 2^n 1\}$, if all values of k are considered). In some embodiments, the state (e.g., quantum state) $|s_k>$ can be constructed using n qubits (e.g., via the one or more quantum computing devices of cryogenic refrigerator 412, which can comprise topological component 108 and/or algorithmic engine component 202).

In some embodiments, the next step in the persistent homology algorithm is to create the barcode (e.g., via the one or more quantum computing devices of cryogenic refrigerator 412, which can comprise topological component 108 and/or algorithmic engine component 202) based on point cloud distance (e.g., pairwise distances such as, for instance, Euclidean distances). In some embodiments, such one or more quantum computing devices of cryogenic refrigerator 412, which can comprise topological component 108 and/or algorithmic engine component 202 can define the diameter $D(s_k)$ as the maximum distance between two vertices of the simplex $$D(S_k) = \max_{i_l, i_{l'}} |v_{i_l} - v_{i_{l'}}|$$

now a subset inclusion criterion can be defined. A simplex $S_k$ is included in the simplicial complex, if $D(S_k) \leq \epsilon$ (called the Vitoris-Rips inclusion criterion) and the simplex is denoted $S_k^\epsilon$. Epsilon is the given radius (e.g., the defined/varied homological persistence scale). In some embodiments, the parameter $\epsilon$ can be encoded using m qubits by writing down $|x\rangle$, $x=0, 1, \ldots 2^m-1$ and taking $x=(2^m-1)\epsilon$.

In some embodiments, in a general manner, such one or more quantum computing devices of cryogenic refrigerator 412, which can comprise topological component 108 and/or algorithmic engine component 202 can construct a boundary mapping $\partial_k$ (e.g., equation 410) from a simplex into the space of its geometrical boundary. In some embodiments, the projection operator (e.g., equation 408) can be defined by equation (1) below.

$$P_k^\epsilon = \sum_{s_k \in S_k^\epsilon} |s_k\rangle \langle s_k| \quad (1)$$

$$\partial_k |s_k\rangle = \sum_{l=0}^{k} (-1)^l |s_{k-1}(l)\rangle = \sum_{l=0}^{k} (-1)^l X_{l_i} |s_k\rangle \quad (2)$$

where $X_{i_l}$ is X acting on the $i_l$th qubit and X is the Quantum $\sigma_x$ gate.

which for a given $\epsilon$ barcode expansion can be written as $$\tilde{\partial}_k^\epsilon = P_{k-1}^\epsilon \partial_k P_k^\epsilon$$

for example, observe a simplex of a triangle with vertices 1, 2, 3, then $$\partial_k^\epsilon |111\rangle = |011\rangle - |101\rangle + |110\rangle$$

In some embodiments, in fact, such one or more quantum computing devices of cryogenic refrigerator 412, which can comprise topological component 108 and/or algorithmic engine component 202 can split the entire Hilbert space of n qubits into n+1 subspaces labeled by k. In some embodiments, to enumerate the space splitting such one or more quantum computing devices of cryogenic refrigerator 412, which can comprise topological component 108 and/or algorithmic engine component 202 can use extra ancillary qubits, a register of $\log_2 n$ qubits to store the state $|k\rangle$ and map $$|s_k\rangle \rightarrow |k\rangle |s_k\rangle$$

which can be done (e.g., via the one or more quantum computing devices of cryogenic refrigerator 412, which can comprise topological component 108 and/or algorithmic engine component 202) in n steps as follows. In some embodiments, such one or more quantum computing devices of cryogenic refrigerator 412, which can comprise topological component 108 and/or algorithmic engine component 202 can start with the state $|0\rangle$ for the register. In some embodiments, such one or more quantum computing devices of cryogenic refrigerator 412, which can comprise topological component 108 and/or algorithmic engine component 202 can apply the permutation $$\mathcal{P}: |0\rangle \rightarrow |1\rangle \rightarrow |2\rangle \rightarrow \ldots \rightarrow |n-1\rangle \rightarrow |n\rangle$$

for each digit of $|s_k\rangle$ equal to 1 (using the qubit corresponding to each digit as control). In some embodiments, the permutation $\mathcal{P}$ can be a 1-sparse matrix and can be implemented efficiently. In some embodiments, thus, such one or more quantum computing devices of cryogenic refrigerator 412, which can comprise topological component 108 and/or algorithmic engine component 202 can apply $\mathcal{P}_k$, so $|0\rangle \rightarrow \mathcal{P}^k |0\rangle = |k\rangle$, as desired.

using a different notation to be consistent with the topological literature $$(\tilde{B}^\epsilon)^2 = \text{diag}(\Delta_0^\epsilon, \Delta_1^\epsilon, \ldots, \Delta_n^\epsilon)$$

where $$\Delta_0^\epsilon = \tilde{\partial}_0^{\epsilon\dagger} \tilde{\partial}_0^\epsilon, \Delta_n^\epsilon = \tilde{\partial}_n^{\epsilon\dagger} \tilde{\partial}_n^\epsilon$$

and $$\Delta_k^\epsilon = \tilde{\delta}_k^{\epsilon\dagger} \tilde{\delta}_k^\epsilon + \tilde{\delta}_{k+1}^\epsilon \tilde{\delta}_{k+1}^{\epsilon\dagger}, \ k \in \{1, \ldots, n-1\}$$

is the combinatorial Laplacian of the kth simplicial complex. In some embodiments, the output of a kth combinatorial Laplacian being zero can indicate that a space has been found which is boundary less and not a boundary itself. In some embodiments, the number of these features in the data is the Betti number. In some embodiments, thus, the dimension of the kernel of combinatorial Laplacian is the Betti number $$\beta_k = |\ker \Delta_k^\epsilon|$$

In some embodiments, the output of such one or more quantum computing devices of cryogenic refrigerator 412, which can comprise topological component 108 and/or algorithmic engine component 202 after performing the operations described above can comprise results 414. In some embodiments, results 414 can comprise a posterior distribution (e.g., a histogram) that can be determined by, for instance, such one or more quantum computing devices of cryogenic refrigerator 412, which can comprise topological component 108 and/or algorithmic engine component 202 using a P-QPE algorithm for the induvial Betti numbers. In some embodiments, the X-axis of results 414 can comprise Betti numbers (denoted as $b_0$ in FIG. 4), which can comprise integers that can be represented by localized distributions around each integer as illustrated by, for example, the localized distributions around the integer 1 in results 414 depicted in FIG. 4. In some embodiments, the Y-axis of results 414 can comprise values (denoted as $p(b_0)$ in FIG. 4) that are proportional to the probability corresponding to the Betti numbers $b_0$ depicted in the X-axis of results 414.

Figure 5A:
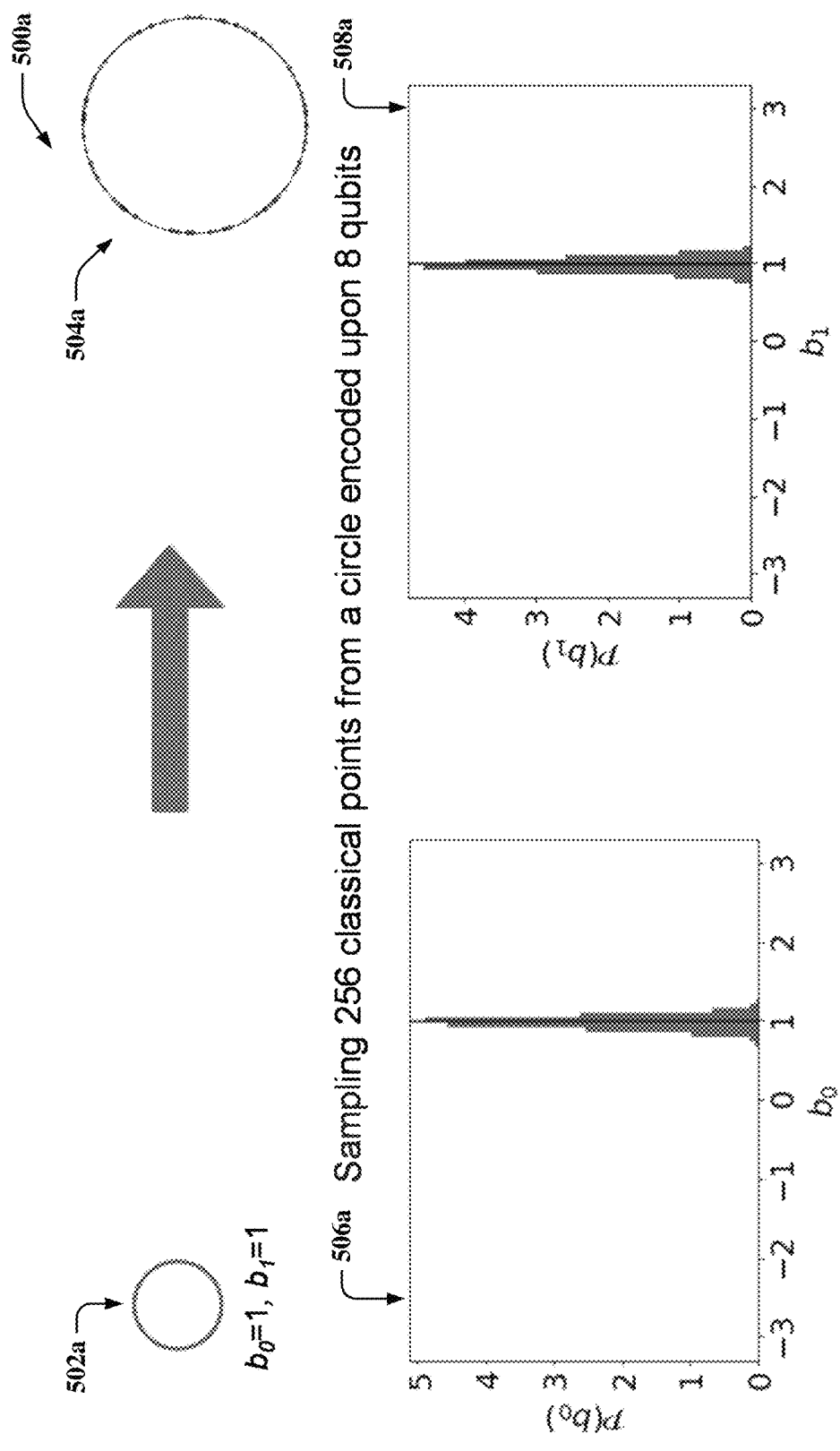
FIGS. 5A, 5B, and 5C illustrate diagrams of example, non-limiting systems that can facilitate quantum topological classification in accordance with one or more embodiments described herein.
Figure 5B:
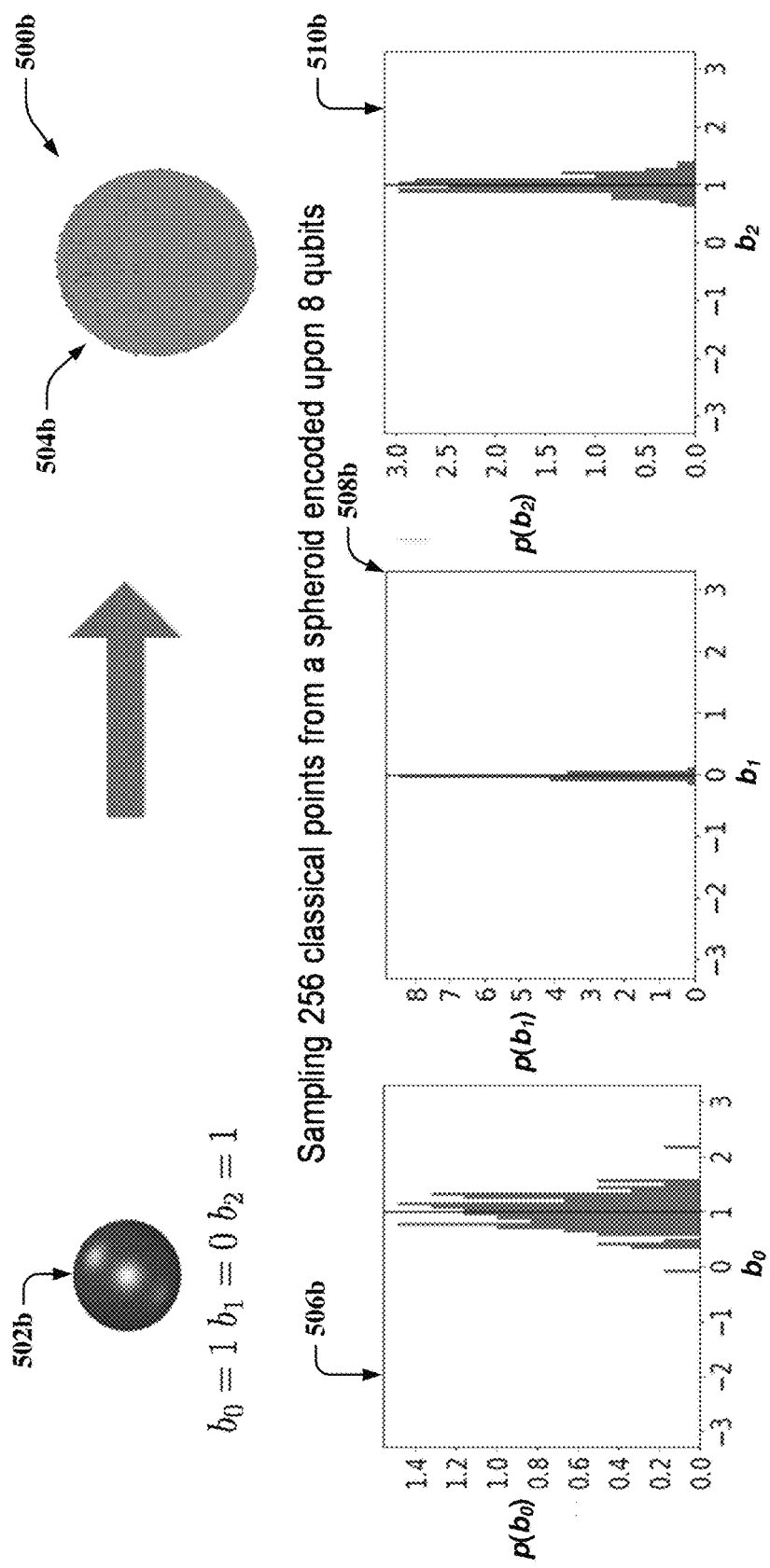
Figure 5C:
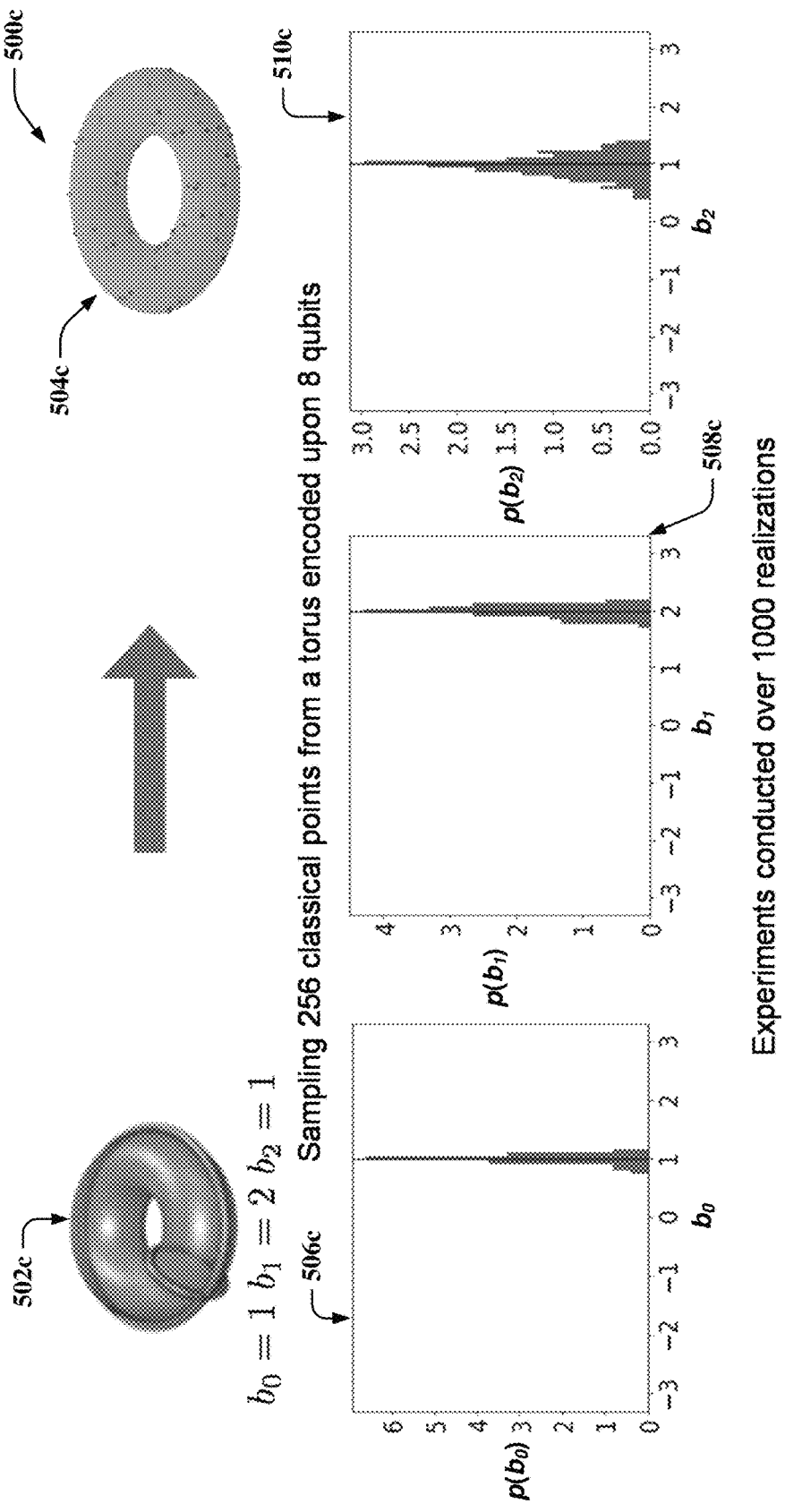

FIGS. 5A, 5B, and 5C illustrate diagrams of example, non-limiting systems 500a, 500b, 500c that can facilitate quantum topological classification in accordance with one or more embodiments described herein. Repetitive description of like elements and/or processes employed in respective embodiments is omitted for sake of brevity.

In some embodiments, system 500a (FIB. 5A) can comprise a full geometrical form 502a of a topological object comprising a circle that can be represented as a down sampled form 504a that can be input to a quantum computing device (e.g., one or more quantum computing devices of cryogenic refrigerator 412, which can comprise topological component 108 and/or algorithmic engine component 202). In some embodiments, system 500a can comprise results 506a and/or results 508a that can comprise example, non-limiting alternative embodiments of results 414 described above with reference to FIG. 4, where results 506a and/or results 508a can comprise posterior distributions (e.g., histograms) corresponding to full geometrical form 502a and/or down sampled form 504a. In some embodiments, results 506a and/or results 508a can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 506a can comprise Betti numbers (denoted as $b_0$ in FIG. 5A) that can define the number of connected components (denoted as # of connected component in FIG. 5A) corresponding to full geometrical form 502a and/or down sampled form 504a. In some embodiments, the Y-axis of results 506a can comprise values (denoted as $p(b_0)$ in FIG. 5A) that are proportional to the probability corresponding to the Betti numbers $b_0$ depicted in the X-axis of results 506a. In some embodiments, the X-axis of results 508a can comprise Betti numbers (denoted as $b_1$ in FIG. 5A) that can define the number of holes (denoted as # of holes in FIG. 5A) corresponding to full geometrical form 502a and/or down sampled form 504a. In some embodiments, the Y-axis of results 508a can comprise values (denoted as $p(b_1)$ in FIG. 5A) that are proportional to the probability corresponding to the Betti numbers $b_1$ depicted in the X-axis of results 508a.

In some embodiments, system 500b (FIB. 5B) can comprise a full geometrical form 502b of a topological object comprising a sphere that can be represented as a down sampled form 504b that can be input to a quantum computing device (e.g., one or more quantum computing devices of cryogenic refrigerator 412, which can comprise topological component 108 and/or algorithmic engine component 202). In some embodiments, system 500b can comprise results 506b, results 508b, and/or results 510b that can comprise example, non-limiting alternative embodiments of results 506a and/or results 508a described above with reference to FIG. 5A, where results 506b, results 508b, and/or results 510b can comprise posterior distributions (e.g., histograms) corresponding to full geometrical form 502b and/or down sampled form 504b. In some embodiments, results 506b, results 508b, and/or results 510b can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 506b can comprise Betti numbers (denoted as $b_0$ in FIG. 5B) that can define the number of connected components (denoted as # of connected component in FIG. 5B) corresponding to full geometrical form 502b and/or down sampled form 504b. In some embodiments, the Y-axis of results 506b can comprise values (denoted as $p(b_0)$ in FIG. 5B) that are proportional to the probability corresponding to the Betti numbers $b_0$ depicted in the X-axis of results 506b. In some embodiments, the X-axis of results 508b can comprise Betti numbers (denoted as $b_1$ in FIG. 5B) that can define the number of holes (denoted as # of holes in FIG. 5B) corresponding to full geometrical form 502b and/or down sampled form 504b. In some embodiments, the Y-axis of results 508b can comprise values (denoted as $p(b_1)$ in FIG. 5B) that are proportional to the probability corresponding to the Betti numbers $b_1$ depicted in the X-axis of results 508b. In some embodiments, the X-axis of results 510b can comprise Betti numbers (denoted as $b_2$ in FIG. 5B) that can define the number of voids (denoted as # of voids in FIG. 5B) corresponding to full geometrical form 502b and/or down sampled form 504b. In some embodiments, the Y-axis of results 510b can comprise values (denoted as $p(b_2)$ in FIG. 5B) that are proportional to the probability corresponding to the Betti numbers $b_2$ depicted in the X-axis of results 510b.

In some embodiments, system 500c (FIB. 5C) can comprise a full geometrical form 502c of a topological object comprising a torus that can be represented as a down sampled form 504c that can be input to a quantum computing device (e.g., one or more quantum computing devices of cryogenic refrigerator 412, which can comprise topological component 108 and/or algorithmic engine component 202). In some embodiments, system 500c can comprise results 506c, results 508c, and/or results 510c that can comprise example, non-limiting alternative embodiments of results 506b, results 508b, and/or results 510b described above with reference to FIG. 5B, where results 506c, results 508c, and/or results 510c can comprise posterior distributions (e.g., histograms) corresponding to full geometrical form 502c and/or down sampled form 504c. In some embodiments, results 506c, results 508c, and/or results 510c can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 506c can comprise Betti numbers (denoted as $b_0$ in FIG. 5C) that can define the number of connected components (denoted as # of connected component in FIG. 5C) corresponding to full geometrical form 502c and/or down sampled form 504c. In some embodiments, the Y-axis of results 506c can comprise values (denoted as $p(b_0)$ in FIG. 5C) that are proportional to the probability corresponding to the Betti numbers $b_0$ depicted in the X-axis of results 506c. In some embodiments, the X-axis of results 508c can comprise Betti numbers (denoted as $b_1$ in FIG. 5C) that can define the number of holes (denoted as # of holes in FIG. 5C) corresponding to full geometrical form 502c and/or down sampled form 504c. In some embodiments, the Y-axis of results 508c can comprise values (denoted as $p(b_1)$ in FIG. 5C) that are proportional to the probability corresponding to the Betti numbers $b_1$ depicted in the X-axis of results 508c. In some embodiments, the X-axis of results 510c can comprise Betti numbers (denoted as $b_2$ in FIG. 5C) that can define the number of voids (denoted as # of voids in FIG. 5C) corresponding to full geometrical form 502c and/or down sampled form 504c. In some embodiments, the Y-axis of results 510c can comprise values (denoted as $p(b_2)$ in FIG. 5C) that are proportional to the probability corresponding to the Betti numbers $b_2$ depicted in the X-axis of results 510c.

Figure 6A:
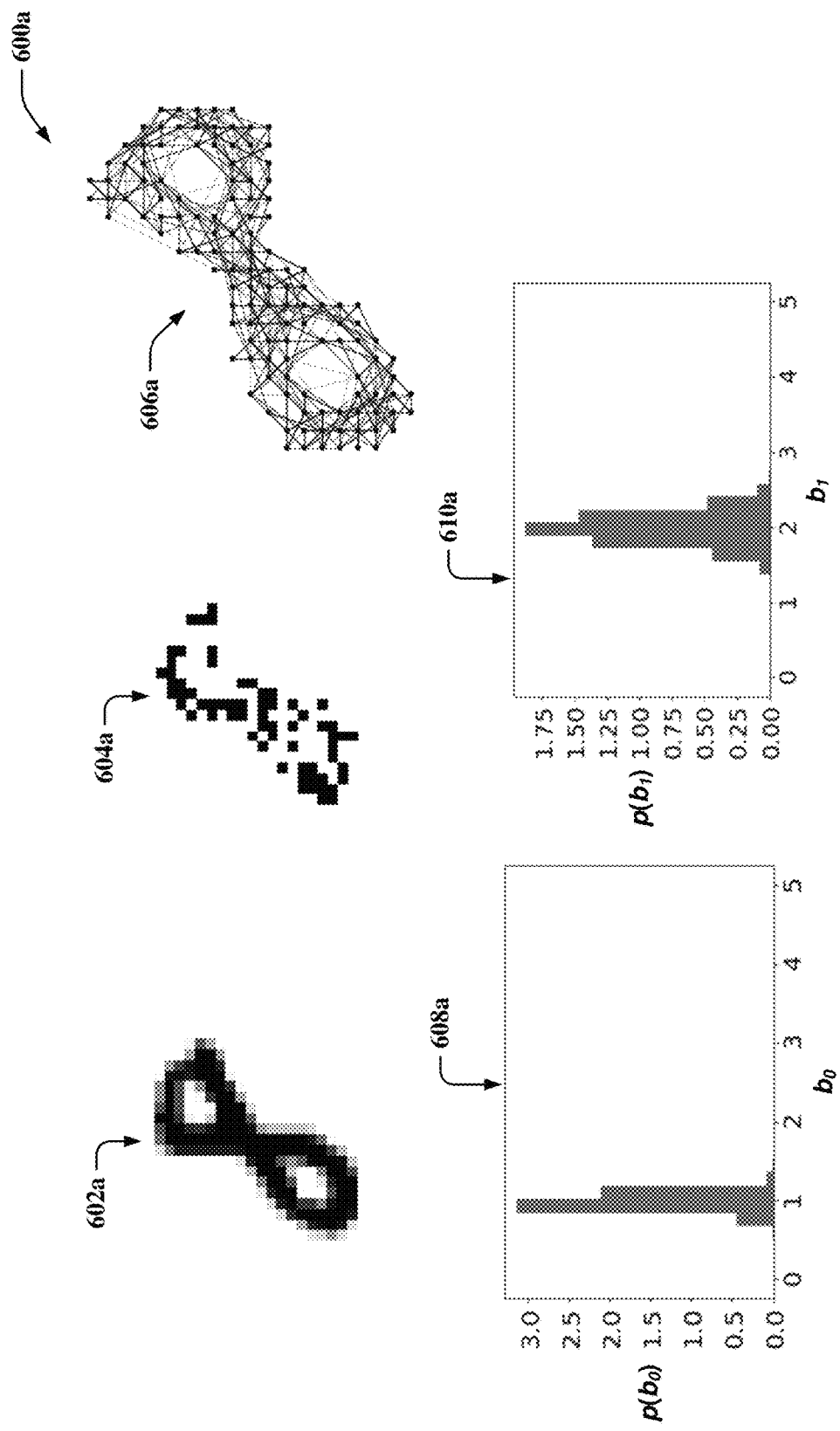
FIGS. 6A, 6B, and 6C illustrate diagrams of example, non-limiting systems that can facilitate quantum topological classification in accordance with one or more embodiments described herein.
Figure 6B:
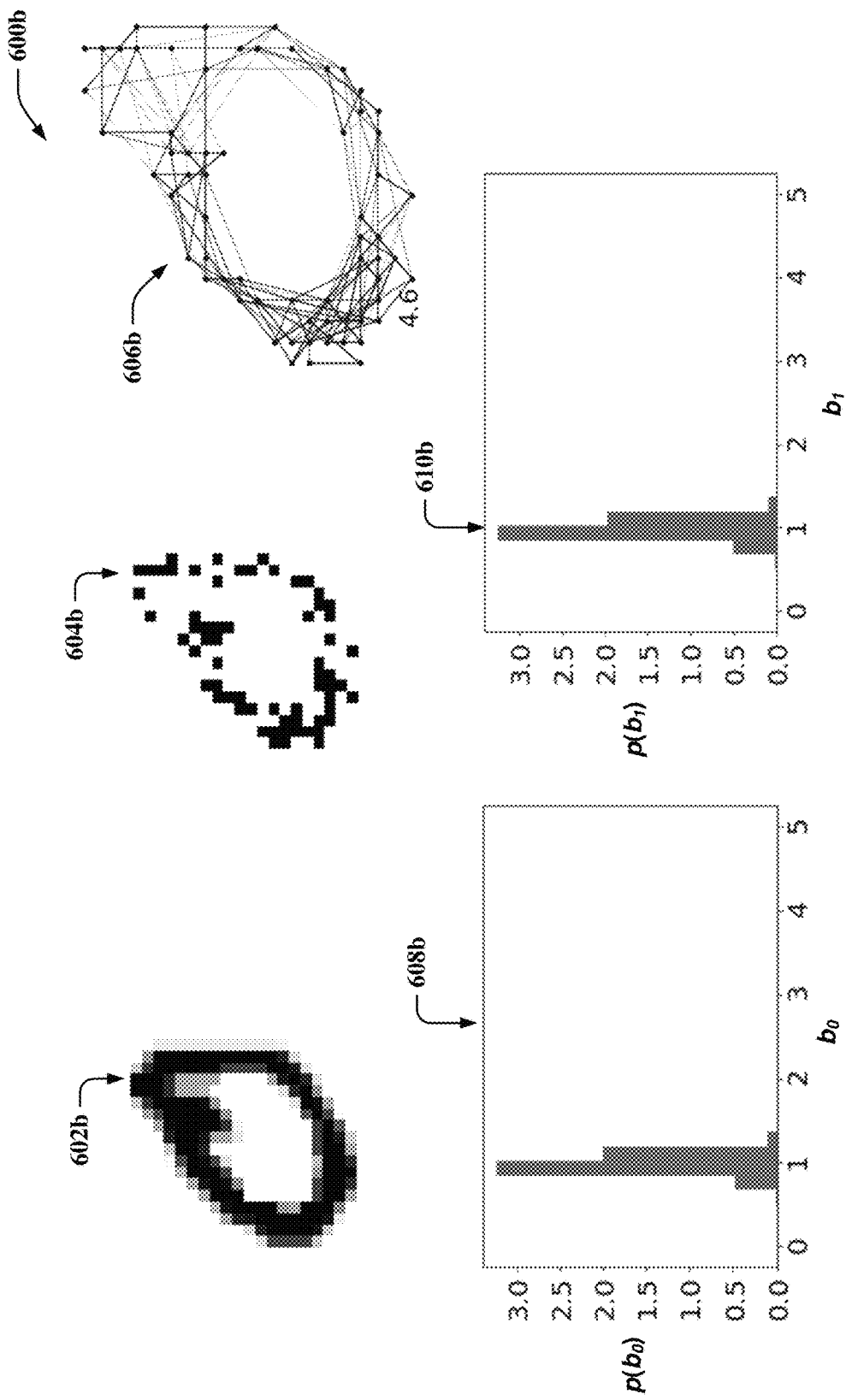
Figure 6C:
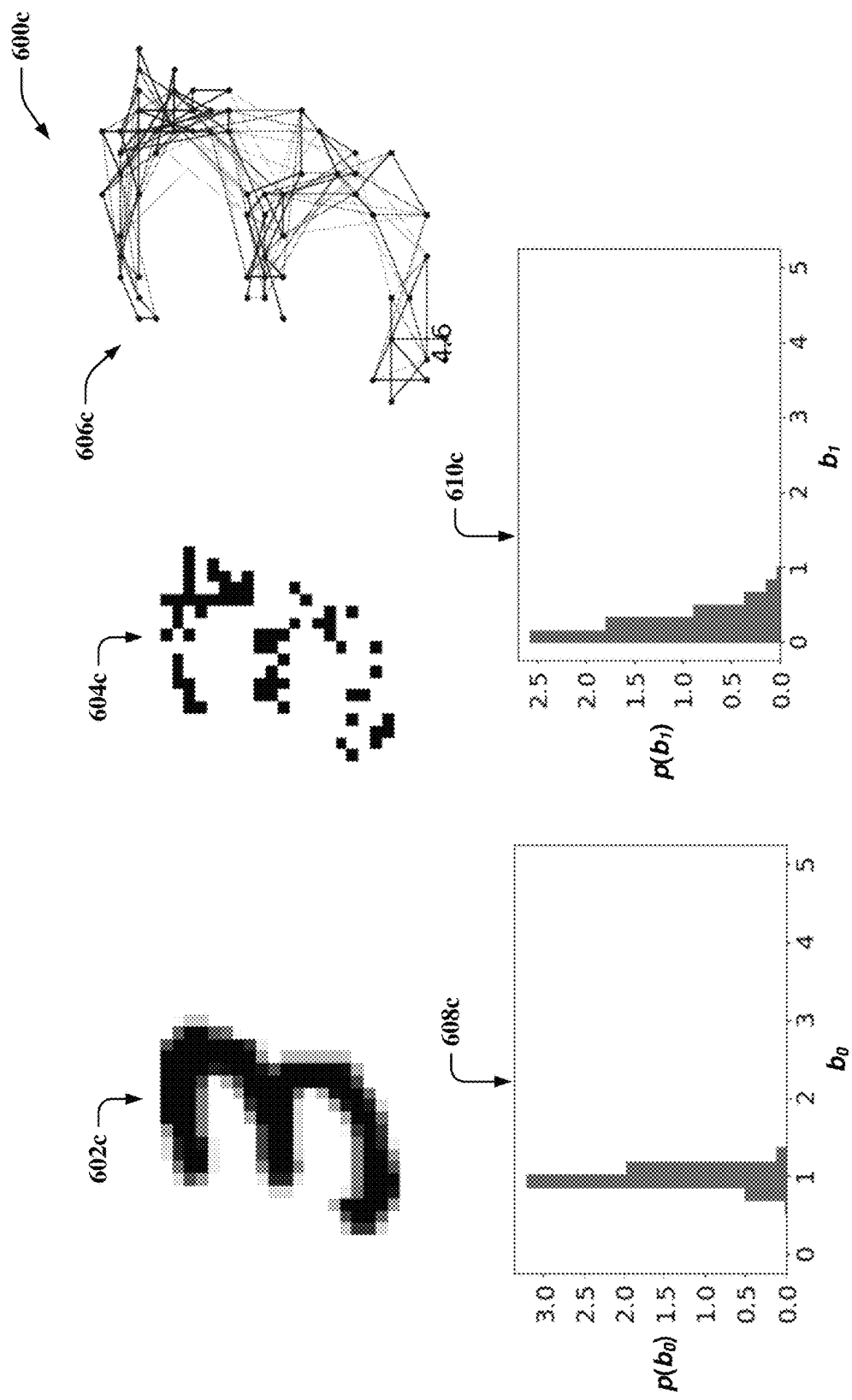

FIGS. 6A, 6B, and 6C illustrate diagrams of example, non-limiting systems 600a, 600b, 600c that can facilitate quantum topological classification in accordance with one or more embodiments described herein. Repetitive description of like elements and/or processes employed in respective embodiments is omitted for sake of brevity.

In some embodiments, system 600a (FIB. 6A) can comprise a numerical digit image 602a that can comprise an image of a numerical digit (e.g., 8) of the Modified National Institute of Standards and Technology (MNIST) database. In some embodiments, numerical digit image 602a can comprise a topological object that can be represented as a pixelated form 604a and/or as a down sampled form 606a that can be input to a quantum computing device (e.g., one or more quantum computing devices of cryogenic refrigerator 412, which can comprise topological component 108 and/or algorithmic engine component 202). In some embodiments, system 600a can comprise results 608a and/or results 610a that can comprise example, non-limiting alternative embodiments of results 506a and/or results 508a described above with reference to FIG. 5A, where results 608a and/or results 610a can comprise posterior distributions (e.g., histograms) corresponding to pixelated form 604a and/or down sampled form 606a. In some embodiments, results 608a and/or results 610a can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 608a can comprise Betti numbers (denoted as $b_0$ in FIG. 6A) that can define the number of connected components (denoted as # of connected component in FIG. 6A) corresponding to pixelated form 604a and/or down sampled form 606a. In some embodiments, the Y-axis of results 608a can comprise values (denoted as $p(b_0)$ in FIG. 6A) that are proportional to the probability corresponding to the Betti numbers $b_0$ depicted in the X-axis of results 608a. In some embodiments, the X-axis of results 610a can comprise Betti numbers (denoted as $b_1$ in FIG. 6A) that can define the number of holes (denoted as # of holes in FIG. 6A) corresponding to pixelated form 604a and/or down sampled form 606a. In some embodiments, the Y-axis of results 610a can comprise values (denoted as $p(b_1)$ in FIG. 6A) that are proportional to the probability corresponding to the Betti numbers $b_1$ depicted in the X-axis of results 610a.

In some embodiments, system 600b (FIB. 6B) can comprise a numerical digit image 602b that can comprise an image of a numerical digit (e.g., 0) of the Modified National Institute of Standards and Technology (MNIST) database. In some embodiments, numerical digit image 602b can comprise a topological object that can be represented as a pixelated form 604b and/or as a down sampled form 606b that can be input to a quantum computing device (e.g., one or more quantum computing devices of cryogenic refrigerator 412, which can comprise topological component 108 and/or algorithmic engine component 202). In some embodiments, system 600b can comprise results 608b and/or results 610b that can comprise example, non-limiting alternative embodiments of results 608a and/or results 610a described above with reference to FIG. 6A, where results 608b and/or results 610b can comprise posterior distributions (e.g., histograms) corresponding to pixelated form 604b and/or down sampled form 606b. In some embodiments, results 608b and/or results 610b can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 608b can comprise Betti numbers (denoted as $b_0$ in FIG. 6B) that can define the number of connected components (denoted as # of connected component in FIG. 6B) corresponding to pixelated form 604b and/or down sampled form 606b. In some embodiments, the Y-axis of results 608b can comprise values (denoted as $p(b_0)$ in FIG. 6B) that are proportional to the probability corresponding to the Betti numbers $b_0$ depicted in the X-axis of results 608b. In some embodiments, the X-axis of results 610b can comprise Betti numbers (denoted as $b_1$ in FIG. 6B) that can define the number of holes (denoted as # of holes in FIG. 6B) corresponding to pixelated form 604b and/or down sampled form 606b. In some embodiments, the Y-axis of results 610b can comprise values (denoted as $p(b_1)$ in FIG. 6B) that are proportional to the probability corresponding to the Betti numbers $b_1$ depicted in the X-axis of results 610b.

In some embodiments, system 600c (FIB. 6C) can comprise a numerical digit image 602c that can comprise an image of a numerical digit (e.g., 3) of the Modified National Institute of Standards and Technology (MNIST) database. In some embodiments, numerical digit image 602c can comprise a topological object that can be represented as a pixelated form 604c and/or as a down sampled form 606c that can be input to a quantum computing device (e.g., one or more quantum computing devices of cryogenic refrigerator 412, which can comprise topological component 108 and/or algorithmic engine component 202). In some embodiments, system 600c can comprise results 608c and/or results 610c that can comprise example, non-limiting alternative embodiments of results 608b and/or results 610b described above with reference to FIG. 6B, where results 608c and/or results 610c can comprise posterior distributions (e.g., histograms) corresponding to pixelated form 604c and/or down sampled form 606c. In some embodiments, results 608c and/or results 610c can be determined as described above with reference to FIGS. 1, 2, 3, and 4 using a quantum computing device (e.g., one or more quantum computing devices of cryogenic refrigerator 412, which can comprise topological component 108 and/or algorithmic engine component 202).

In some embodiments, the X-axis of results 608c can comprise Betti numbers (denoted as $b_0$ in FIG. 6C) that can define the number of connected components (denoted as # of connected component in FIG. 6C) corresponding to pixelated form 604c and/or down sampled form 606c. In some embodiments, the Y-axis of results 608c can comprise values (denoted as $p(b_0)$ in FIG. 6C) that are proportional to the probability corresponding to the Betti numbers $b_0$ depicted in the X-axis of results 608c. In some embodiments, the X-axis of results 610c can comprise Betti numbers (denoted as $b_1$ in FIG. 6C) that can define the number of holes (denoted as # of holes in FIG. 6C) corresponding to pixelated form 604c and/or down sampled form 606c. In some embodiments, the Y-axis of results 610c can comprise values (denoted as $p(b_1)$ in FIG. 6C) that are proportional to the probability corresponding to the Betti numbers $b_1$ depicted in the X-axis of results 610c.

In some embodiments, quantum topological classification system 102 can be associated with various technologies. For example, quantum topological classification system 102 can be associated with classical computing technologies, quantum computing technologies, classical topological classification technologies, quantum topological classification technologies, classical artificial intelligence (AI) model technologies, quantum AI model technologies, classical machine learning (ML) model technologies, quantum ML model technologies, cloud computing technologies, Internet-of-Things (IoT) technologies, and/or other technologies.

In some embodiments, quantum topological classification system 102 can provide technical improvements to systems, devices, components, operational steps, and/or processing steps associated with the various technologies identified above. For example, quantum topological classification system 102 (e.g., via topological component 108, topological classifier component 110, algorithmic engine component 202, etc.) can employ a quantum computing device and the one or more quantum computing operations described herein, as well as a classical computing device and one or more of the models defined above with reference to FIG. 1 to perform topological classification and/or image classification tasks that cannot be efficiently and/or effectively processed (e.g., from a computational standpoint) using only a classical computing device.

In some embodiments, quantum topological classification system 102 can provide technical improvements to a processing unit (e.g., processor 106) associated with a classical computing device (e.g., a classical computer). For example, as described above with reference to FIG. 1, using a quantum computing device (e.g., quantum computer, quantum simulator, etc.) to construct a topological simplicial structure (e.g., simplicial complex) can result in quantum computational costs of $O(n^2)$ operations on $O(n)$ qubits, whereas use of a classical computing device (e.g., a classical computer that employs processor 106) to construct a representation of such a topological simplicial structure (e.g., simplicial complex) can result in classical computational costs of $O(2^n)$ operations on $O(2^n)$ bits, where n can denote a quantity of data points representing an image. In another example, quantum topological classification system 102 (e.g., topological component 108, algorithmic engine component 202, etc.) can employ a quantum computing device (e.g., quantum computer, quantum simulator, etc.) to diagonalize the Laplacian and/or determine Betti numbers (e.g., via algorithmic engine component 202). In this example, using such a quantum computing device to diagonalize the Laplacian and/or determine Betti numbers (e.g., via algorithmic engine component 202) can result in quantum computational costs of $O(n^5/\delta)$ quantum operations, whereas use of a classical computing device (e.g., a classical computer that employs processor 106) to diagonalize the Laplacian and/or determine Betti numbers can result in classical computational costs of $O(2^{2n} \log(1/\delta))$ operations, where n can denote a quantity of data points and δ can denote the desired accuracy to which the Betti numbers are to be calculated to.

In some embodiments, quantum topological classification system 102 can employ hardware or software to solve problems that are highly technical in nature, that are not abstract and that cannot be performed as a set of mental acts by a human. In some embodiments, some of the processes described herein can be performed by one or more specialized computers (e.g., specialized classical computer(s), specialized classical processing unit(s), specialized quantum computer(s), specialized quantum processing unit(s), etc.) for carrying out defined tasks related to the various technologies identified above. In some embodiments, quantum topological classification system 102 and/or components thereof, can be employed to solve new problems that arise through advancements in technologies mentioned above, employment of quantum computing systems, cloud computing systems, computer architecture, and/or another technology.

It is to be appreciated that quantum topological classification system 102 can utilize various combinations of electrical components, mechanical components, and circuitry that cannot be replicated in the mind of a human or performed by a human, as the various operations that can be executed by quantum topological classification system 102 or components thereof as described herein are operations that are greater than the capability of a human mind. For instance, the amount of data processed, the speed of processing such data, and/or the types of data processed by quantum topological classification system 102, topological component 108, topological classifier component 110, and/or algorithmic engine component 202 over a certain period of time can be greater, faster, and/or different than the amount, speed, or data type that can be processed by a human mind over the same period of time.

According to several embodiments, quantum topological classification system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum topological classification system 102 can include information that is impossible to obtain manually by an entity, such as a human user. For example, the type, amount, or variety of information included in quantum topological classification system 102, topological component 108, topological classifier component 110, and/or algorithmic engine component 202 can be more complex than information obtained manually by a human user.

Figure 7:
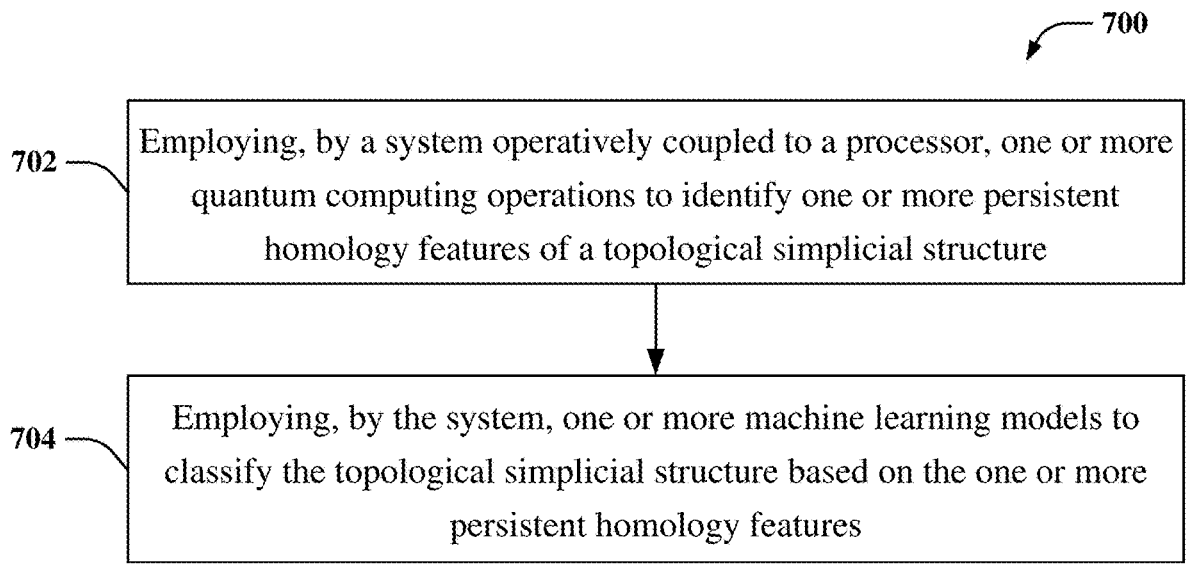
FIG. 7 illustrates a flow diagram of an example, non-limiting computer-implemented method that can facilitate quantum topological classification in accordance with one or more embodiments described herein.

FIG. 7 illustrates a flow diagram of an example, non-limiting computer-implemented method 700 that can facilitate quantum topological classification in accordance with one or more embodiments described herein. Repetitive description of like elements and/or processes employed in respective embodiments is omitted for sake of brevity.

In some embodiments, at 702, computer-implemented method 700 can comprise employing, by a system (e.g., quantum topological classification system 102, topological component 108, and/or algorithmic engine component 202) operatively coupled to a processor (e.g., processor 106), one or more quantum computing operations (e.g., the one or more quantum computing operations described above with reference to FIGS. 1, 2, 3, and 4) to identify one or more persistent homology features of a topological simplicial structure.

In some embodiments, at 704, computer-implemented method 700 can comprise employing, by the system (e.g., quantum topological classification system 102 and/or topological classifier component 110), one or more machine learning models (e.g., one or more models defined above with reference to FIG. 1) to classify the topological simplicial structure based on the one or more persistent homology features.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
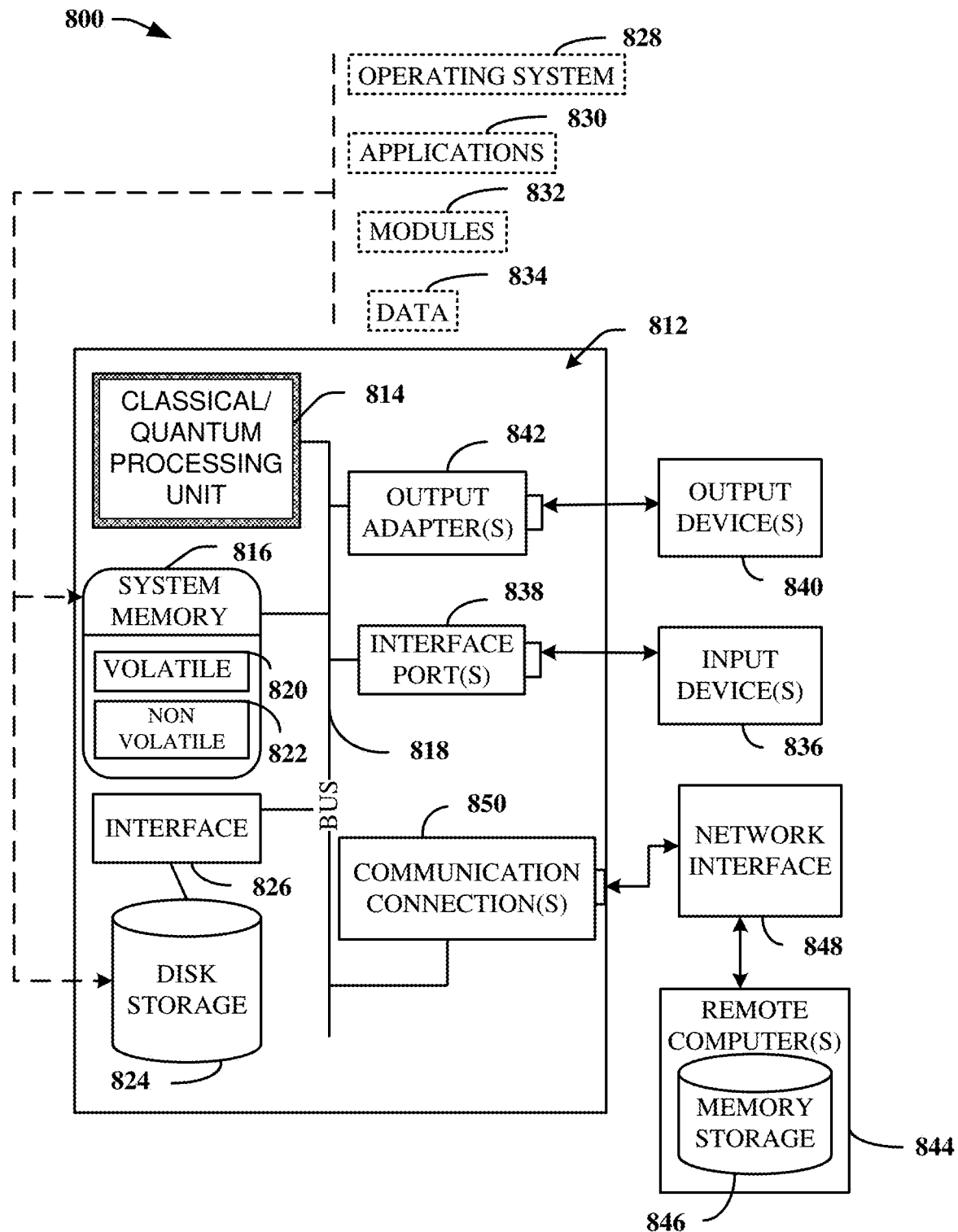
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a classical or quantum processing unit 814, a system memory 816, and a system bus 818. The system bus 818 couples system components including, but not limited to, the system memory 816 to the classical or quantum processing unit 814. The classical or quantum processing unit 814 can be any of various available processors. Dual microprocessors and other multiprocessor architectures also can be employed as the classical or quantum processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the classical or quantum processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
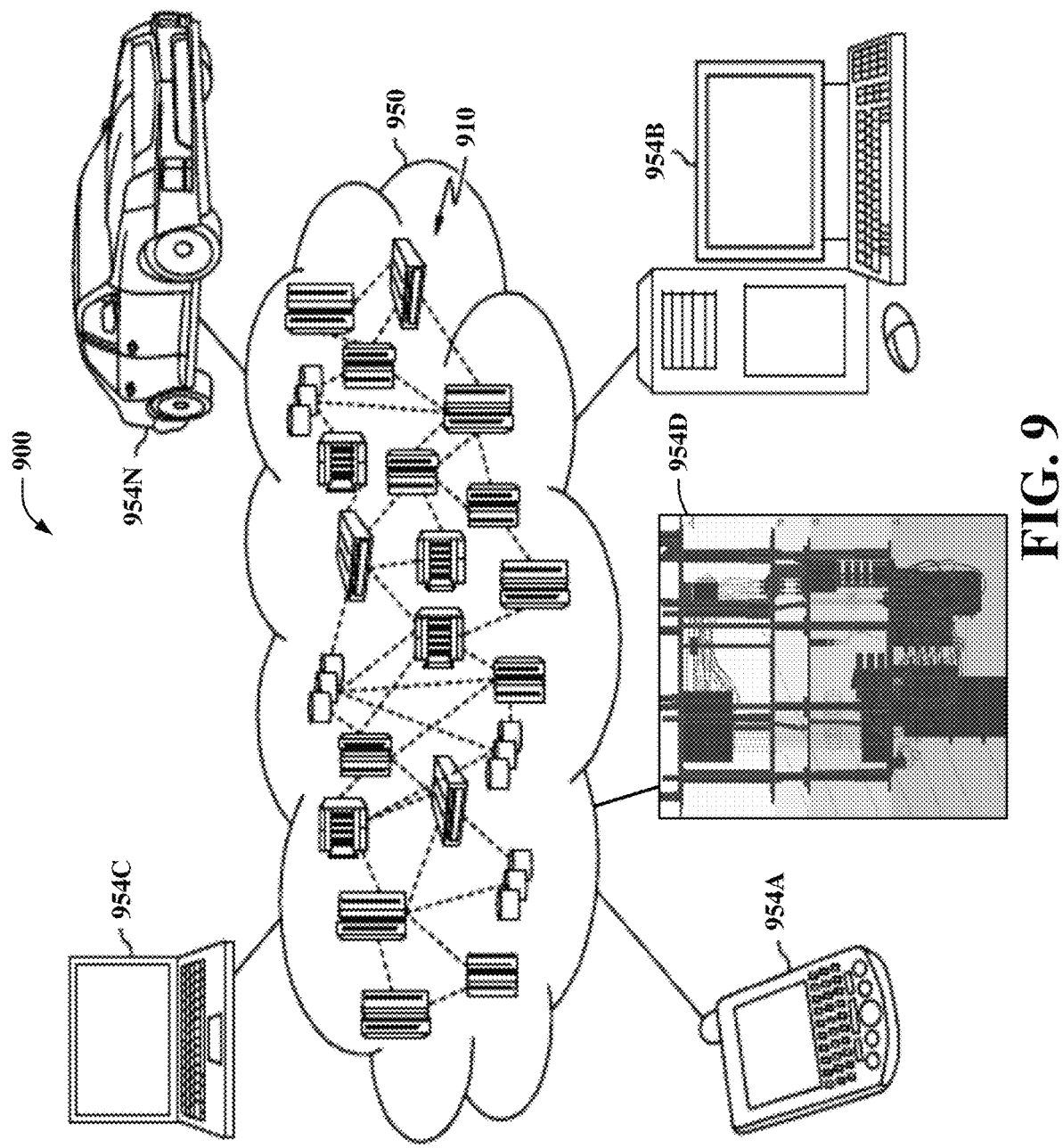
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, mini-412 quantum computer 954D, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
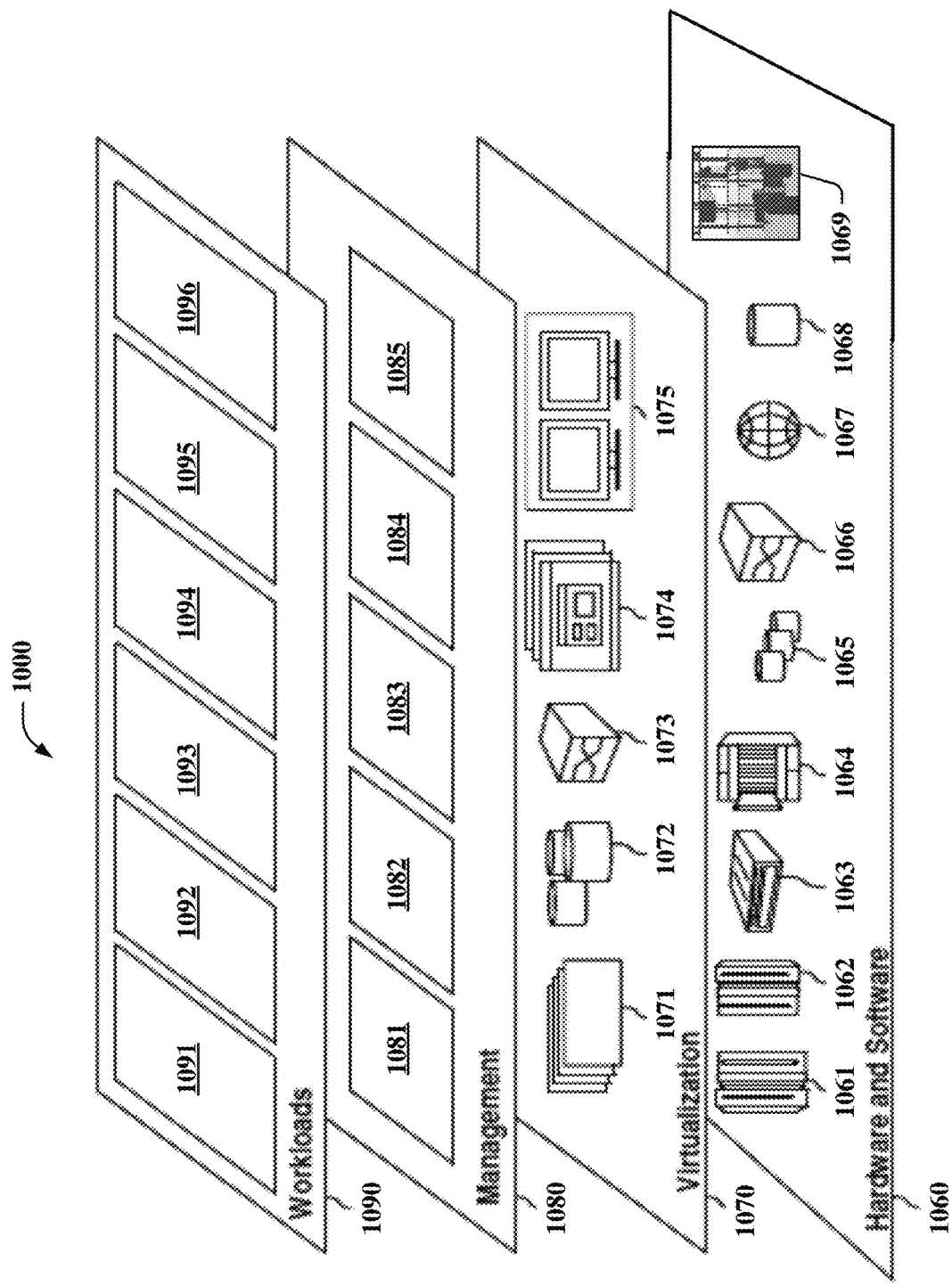
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, and mini-412 quantum computer 1069.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum topological classification software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a topological component that employs one or more quantum computing operations to identify one or more persistent homology features of a topological simplicial structure; and
an algorithmic engine component that employs at least one of a variational quantum eigensolver algorithm or a hybrid Bayesian phase learning algorithm to determine at least one of a kernel of a graph Laplacian matrix or one or more Betti numbers corresponding to one or more quantum representations of the topological simplicial structure at a defined homological persistent scale; and
a topological classifier component that employs one or more machine learning models to classify the topological simplicial structure based on the one or more persistent homology features.

2. The system of claim 1, wherein the topological component employs the one or more quantum computing operations to:
construct the one or more quantum representations of the topological simplicial structure, the one or more quantum representations corresponding to one or more scanned, swept, varied, multiple, or a multitude of homological scales and pairwise distances between data points of the topological simplicial structure; and
expand a superposition over all simplices in the topological simplicial structure to run over all possible sign allocations.

3. The system of claim 2, wherein the topological component employs one or more ancilla qubits to construct the one or more quantum representations of the topological simplicial structure and to expand the superposition over all simplices in the topological simplicial structure.

4. The system of claim 1, wherein the algorithmic engine component employs the variational quantum eigensolver algorithm to determine the kernel of the graph Laplacian matrix as restricted to the quantum representation of the topological simplicial structure at the defined homological persistent scale.

5. The system of claim 1, wherein the algorithmic engine component employs the variational quantum eigensolver algorithm to determine the one or more Betti numbers corresponding to the one or more quantum representations of the topological simplicial structure at the defined homological persistent scale.

6. The system of claim 1, wherein the algorithmic engine component employs the hybrid Bayesian phase learning algorithm to determine the kernel of the graph Laplacian matrix.

7. The system of claim 1, wherein the topological classifier component employs the one or more machine learning models to classify the topological simplicial structure based on the one or more persistent homology features and one or more image classification features, and wherein the one or more machine learning models are selected from a group consisting of a classical artificial intelligence model, a classical machine learning model, a quantum artificial intelligence model, and a quantum machine learning model.

8. The system of claim 1, wherein the topological component employs the one or more quantum computing operations to identify the one or more persistent homology features of the topological simplicial structure to facilitate reduced computational costs of a non-quantum processor.

9. The system of claim 1, wherein the algorithmic engine component employs the hybrid Bayesian phase learning algorithm to determine the one or more Betti numbers corresponding to the one or more quantum representations of the topological simplicial structure at the defined homological persistent scale.

10. A computer-implemented method, comprising:
employing, by a system operatively coupled to a processor, one or more quantum computing operations to identify one or more persistent homology features of a topological simplicial structure;
employing, by the system, at least one of a variational quantum eigensolver algorithm or a hybrid Bayesian phase learning algorithm to determine at least one of a kernel of a graph Laplacian matrix or one or more Betti numbers corresponding to one or more quantum representations of the topological simplicial structure at a defined homological persistent scale; and
employing, by the system, one or more machine learning models to classify the topological simplicial structure based on the one or more persistent homology features.

11. The computer-implemented method of claim 10, further comprising:
employing, by the system, the one or more quantum computing operations to construct the one or more quantum representations of the topological simplicial structure, the one or more quantum representations corresponding to one or more scanned, swept, varied, multiple, or a multitude of homological scales and pairwise distances between data points forming the topological simplicial structure.

12. The computer-implemented method of claim 10, further comprising:
employing, by the system, the variational quantum eigensolver algorithm to determine the kernel of the graph Laplacian matrix as restricted to the quantum representation of the topological simplicial structure at the defined homological persistent scale.

13. The computer-implemented method of claim 10, further comprising:
employing, by the system, the variational quantum eigensolver algorithm to determine the one or more Betti numbers corresponding to the one or more quantum representations of the topological simplicial structure at the defined homological persistent scale.

14. The computer-implemented method of claim 10, further comprising: employing, by the system, the hybrid Bayesian phase learning algorithm to determine the kernel of the graph Laplacian matrix.

15. The computer-implemented method of claim 10, further comprising:
employing, by the system, the one or more machine learning models to classify the topological simplicial structure based on the one or more persistent homology features and one or more image classification features, wherein the one or more machine learning models are selected from a group consisting of a classical artificial intelligence model, a classical machine learning model, a quantum artificial intelligence model, and a quantum machine learning model.

16. A computer program product facilitating quantum topological classification, the computer program product comprising a computer readable storage medium having program instructions embodied therewith, the program instructions executable by a processor to cause the processor to:
employ, by the processor, one or more quantum computing operations to identify one or more persistent homology features of a topological simplicial structure;
employ, by the processor, at least one of a variational quantum eigensolver algorithm or a hybrid Bayesian phase learning algorithm to determine at least one of a kernel of a graph Laplacian matrix or one or more Betti numbers corresponding to one or more quantum representations of the topological simplicial structure at a defined homological persistent scale; and
employ, by the processor, one or more machine learning models to classify the topological simplicial structure based on the one or more persistent homology features.

17. The computer program product of claim 16, wherein the program instructions are further executable by the processor to cause the processor to:
employ, by the processor, the one or more quantum computing operations to construct the one or more quantum representations of the topological simplicial structure, the one or more quantum representations corresponding to one or more scanned, swept, varied, multiple, or a multitude of homological scales and pairwise distances between data points forming the topological simplicial structure.

18. The computer program product of claim 16, wherein the program instructions are further executable by the processor to cause the processor to:
employ, by the processor, the variational quantum eigensolver algorithm to determine the kernel of the graph Laplacian matrix as restricted to the quantum representation of the topological simplicial structure at the defined homological persistent scale.

19. The computer program product of claim 16, wherein the program instructions are further executable by the processor to cause the processor to:
employ, by the processor, the variational quantum eigensolver algorithm to determine the one or more Betti numbers corresponding to the one or more quantum representations of the topological simplicial structure at the defined homological persistent scale.

20. The computer program product of claim 16, wherein the program instructions are further executable by the processor to cause the processor to:
employ, by the processor, the hybrid Bayesian phase learning algorithm to determine the kernel of the graph Laplacian matrix.

* * * * *